(12) United States Patent
Choi et al.

(10) Patent No.: US 11,480,995 B2
(45) Date of Patent: Oct. 25, 2022

(54) INFORMATION HANDLING SYSTEM DISPLAY SUPPORT FOR VIEWING AND INCLINED ORIENTATIONS

(71) Applicant: Dell Products L.P., Round Rock, TX (US)

(72) Inventors: Duck Soo Choi, Austin, TX (US); Kyu Sang Park, Austin, TX (US)

(73) Assignee: Dell Products L.P., Round Rock, TX (US)

(*) Notice: Subject to any disclaimer, the term of this patent is extended or adjusted under 35 U.S.C. 154(b) by 354 days.

(21) Appl. No.: 16/890,040

(22) Filed: Jun. 2, 2020

(65) Prior Publication Data

US 2021/0373682 A1 Dec. 2, 2021

(51) Int. Cl.
*G06F 1/16* (2006.01)
*F16M 11/10* (2006.01)

(52) U.S. Cl.
CPC ........... *G06F 1/1601* (2013.01); *F16M 11/10* (2013.01); *G06F 1/166* (2013.01); *G06F 1/1681* (2013.01); *Y10S 248/918* (2013.01); *Y10S 248/919* (2013.01); *Y10S 248/92* (2013.01); *Y10S 248/922* (2013.01); *Y10S 248/923* (2013.01)

(58) Field of Classification Search
CPC ...... G06F 1/1601; G06F 1/166; G06F 1/1681; Y10S 248/917; Y10S 248/918; Y10S 248/919; Y10S 248/92; Y10S 248/921; Y10S 248/922; Y10S 248/923; Y10S 248/924; F16M 11/10
See application file for complete search history.

(56) References Cited

U.S. PATENT DOCUMENTS

| | | | | |
|---|---|---|---|---|
| 6,158,359 A | * | 12/2000 | Allan | A47B 21/0314 108/1 |
| 6,163,451 A | * | 12/2000 | Chiu | F16M 11/18 248/419 |
| 6,288,891 B1 | * | 9/2001 | Hasegawa | F16M 11/10 361/679.22 |
| 8,888,062 B2 | | 11/2014 | Novin | |
| 9,277,659 B2 | * | 3/2016 | Onda | F16M 11/048 |
| 9,844,152 B2 | | 12/2017 | Heo et al. | |
| 2006/0171105 A1 | * | 8/2006 | Hsiao | G06F 1/1601 361/679.06 |
| 2008/0174943 A1 | * | 7/2008 | Hirasawa | G06F 1/1624 361/679.57 |
| 2008/0265113 A1 | * | 10/2008 | Lin | F16M 11/2021 345/60 |

(Continued)

FOREIGN PATENT DOCUMENTS

EP 1470362 B1 10/2004

*Primary Examiner* — Nidhi Thaker
(74) *Attorney, Agent, or Firm* — Zagorin Cave LLP; Robert W. Holland

(57) ABSTRACT

An all-in-one information handling system holds a display in a raised forward position with a support arm rotationally coupled at a rear side of the information handling system housing and a central location of the display. Gear arms integrated in the support arm engage a gear at the display and gear mechanism at the housing to synchronize rotation of the display from the forward and raised vertical position relative to the housing to a central and lower horizontal position by lowering the support arm to a horizontal position supported by the housing upper surface as the display rotates to the horizontal position.

19 Claims, 8 Drawing Sheets

(56) References Cited

U.S. PATENT DOCUMENTS

| | | | | |
|---|---|---|---|---|
| 2008/0283691 A1* | 11/2008 | Bliven | ............... | F16M 11/10 248/125.2 |
| 2009/0179133 A1* | 7/2009 | Gan | ............... | F16M 11/105 248/422 |
| 2011/0260028 A1* | 10/2011 | Atallah | ............... | F16M 11/24 248/371 |
| 2012/0328222 A1* | 12/2012 | Chen | ............... | G06F 1/1624 384/26 |
| 2014/0252181 A1* | 9/2014 | Mau | ............... | E05D 3/12 248/125.1 |
| 2015/0000436 A1* | 1/2015 | Zhang | ............... | F16M 11/18 74/89.16 |
| 2016/0048176 A1* | 2/2016 | Saito | ............... | G06F 1/1681 16/302 |
| 2018/0003245 A1* | 1/2018 | Castillo | ............... | E05D 3/122 |
| 2018/0275717 A1 | 9/2018 | Ram | | |
| 2020/0080357 A1* | 3/2020 | Lin | ............... | G06F 1/1616 |
| 2020/0378481 A1* | 12/2020 | Laurent | ............... | F16M 11/2021 |

* cited by examiner

INFORMATION HANDLING SYSTEM DISPLAY SUPPORT FOR VIEWING AND INCLINED ORIENTATIONS

BACKGROUND OF THE INVENTION

Field of the Invention

The present invention relates in general to the field of information handling systems, and more particularly to an information handling system display support for viewing and inclined orientations.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components disposed in a housing and present the information as visual images at a display. Desktop information handling systems typically present visual images at a peripheral display by communicating pixel values through a cable or wireless interface. Portable information handling systems, such as tablet and convertible systems, typically integrate the display in a portable housing to support mobile operations. Often, the displays include a touchscreen, such as with a capacitive touch surface, which accepts touch inputs from an end user. For instance, in tablet systems the touchscreen presents a virtual keyboard that accepts typed inputs from an end user. In addition, a touchscreen display also accepts drawing and writing inputs, such as with a stylus device. One drawback with touch inputs at portable information handling systems is that the housings and displays typically have smaller dimensions to enhance portability and support mobile use. Touch inputs at smaller displays tend to have smaller user interface input regions that require more precise touches. Similarly, drawings input at smaller displays tend to offer less precision for the stylus touch conversion to a drawn figure.

Improved touch detection precision and increased display sizes have made touch inputs at larger displays a convenient way for end users to draw. For instance, a larger flat panel display disposed horizontally on a support surface, such as a desktop, allows an end user to draw directly on the display. One result of this input option has been the adoption of all-in-one information handling system configurations. An all-in-one information handling system integrates the processing components and display in a shared housing sized to include a display and generally operating at a fixed location. Typical all-in-one systems are typically configured as large tablet systems that integrate a display of substantial size so that the housing tends to be too awkward for mobile usage scenarios. Instead, the system typically tends to include a kickstand to hold the display in a viewing orientation, such as near vertical, and that retracts to allow the system to lay flat on a surface to accept drawing inputs. As an alternative, an all-in-one information handling system may hold the display separate from a housing that contains processing components, such as with a support arm extending from the housing. Such systems may include a hinge that adjusts the viewing position of the display from a vertical to a horizontal orientation to accept touch inputs at the display; however, such systems tend to have insufficient support to provide a steady writing platform for accepting end user inputs at the display. Further, movement of the display tends to be awkward for the end user.

SUMMARY OF THE INVENTION

Therefore, a need has arisen for a system and method which adapts an all-in-one information handling system between viewing and writing orientations.

In accordance with the present invention, a system and method are provided which substantially reduce the disadvantages and problems associated with previous methods and systems for adapting an information handling system between viewing and writing orientations. A three cylinder hinge arrangement sequences a display between a vertical viewing orientation and horizontal writing orientation with synchronized rotation of a support arm coupled to a rear side of an information handling system housing and central location of the display rear side. In the horizontal configuration, the support arm rests at the upper surface of the housing for stable support of the display while independent rotation at the display allows end user adjustments for desired viewing and writing angles.

More specifically, a housing contains processing components that cooperate to process information, such as a central processing unit (CPU) that executes instructions and a memory that stores the instructions and information. The processing components interface with a display that presents the information as visual images. A support arm rotationally couples the display to the housing with a three cylinder hinge arrangement that includes a base hinge at a rear side of the housing, a display hinge at a central rear location of the display and a secondary hinge that provides rotation of the display independent of the display hinge. A synchronizing mechanism integrated in the support arm synchronizes rotation of the base hinge and display hinge to adapt the display between a raised forward vertical viewing orientation and a lowered central horizontal writing orientation. The support arm rotates from an elevated position in the vertical orientation, such as a 45 degree angle, to a flat position resting on the housing upper surface in the horizontal orientation. Synchronized rotation of the base and display hinges is translated through a gear arm having gear teeth at opposing ends and engaged with a gear of the base and display hinges to slide relative to the support arm during rotation. Biasing springs engaged between the gear arm and support arm provide a bias towards the raised vertical orientation. A torque engine at the base hinge provides resistance to rotation that translates to the display hinge to hold the display in a desired orientation.

The present invention provides a number of important technical advantages. One example of an important technical advantage is that an all-in-one information handling system translates a display between vertical and horizontal orientations within a minimal footprint. Synchronized rotation of a support arm extending from a rear side of the information handling system housing to display lowers the support to rest against the housing upper surface as the display rotates towards the horizontal orientation so that the support arm provides robust support to the display during end user writing inputs. A slight inclination of the display in the horizontal orientation provides a convenient writing platform and rests the display bottom side against a support surface on which the housing rests. A three cylinder hinge arrangement provides rotation of the display independent of the synchronized support arm rotation to allow end user adjustments of viewing angles in the vertical orientation and writing angles in the horizontal orientation. Biasing springs integrated in the support arm and interfaced with the synchronizing mechanism biases the display to the raised vertical orientation to offset the display weight for more convenient end user interactions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An all-in-one information handling system support arm coupled with a three cylinder sequence hinge rotates a display in a synchronized manner from a vertical viewing position to a horizontal writing position over top of an upper surface of the information handling system housing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
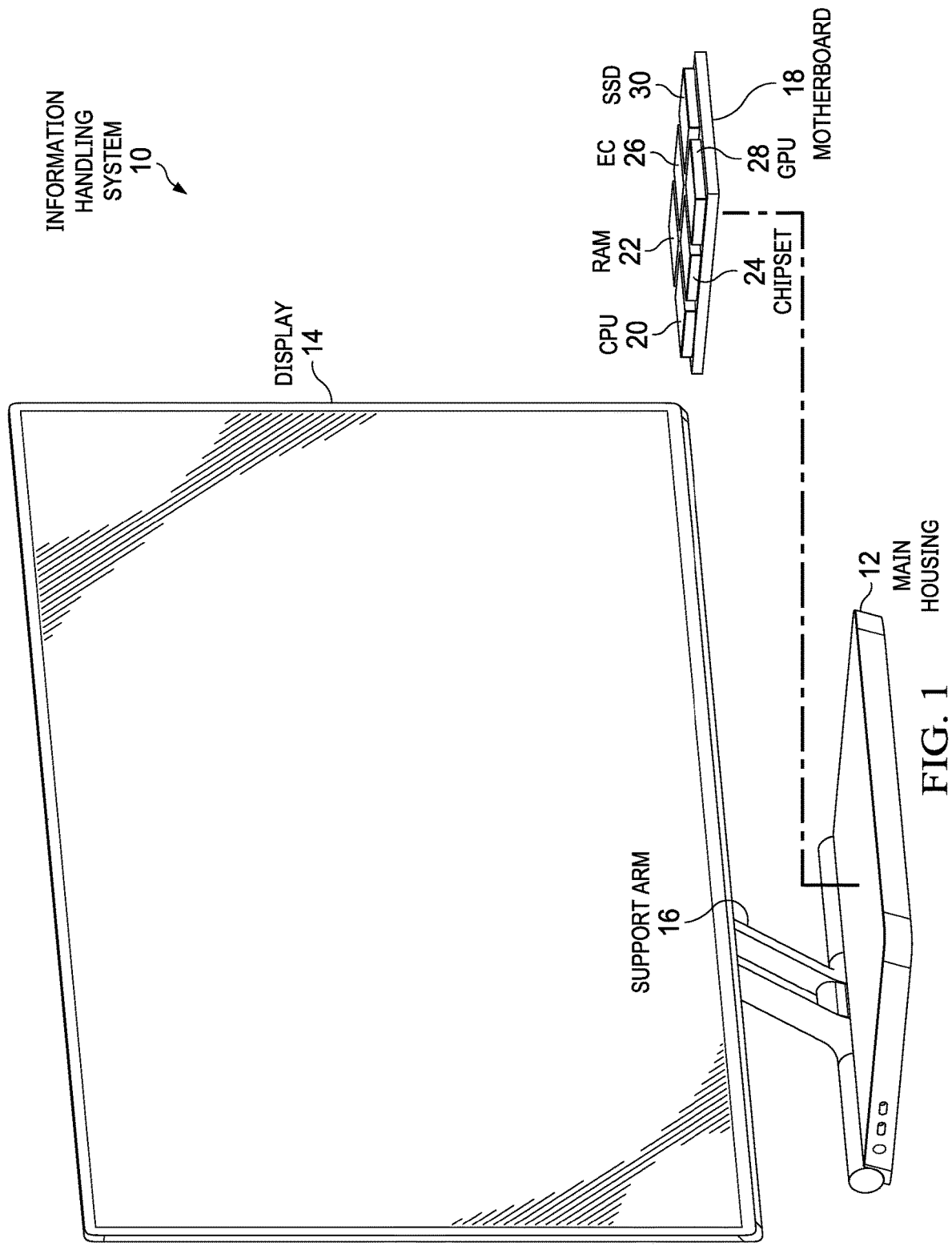
FIG. 1 depicts a side perspective view of an all-in-one information handling system having a display held by a support arm in a raised forward position and processing components exposed with an exploded view.

Referring now to FIG. 1, a side perspective view depicts an all-in-one information handling system 10 having a display 14 held by a support arm 16 in a raised forward position and processing components exposed with an exploded view. In the example embodiment, information handling system 10 processes information with processing components disposed in a main housing 12. For instance, a motherboard 18 supports communication between a central processing unit (CPU) 20 and random access memory (RAM) 22 to cooperate to execute instructions that process the information. A chipset 24 manages CPU 20 operations, such as clock speed, memory accesses and graphics presentation. An embedded controller (EC) 26 manages system component interfaces, power, cooling and user input device interactions. A graphics processor unit (GPU) 28 processes information provided from CPU 20 to generate pixel values for presentation at display 14, such as with communication through a cable integrated in support arm 16. A solid state drive (SSD) 30 provides persistent storage of information during power down states. In alternative embodiments, alternative processing components and system configurations may be used. As described in greater detail below, support arm 16 rotates display 14 between vertical and horizontal orientations with variable display inclination using a three cylinder sequence hinge assembly.

Figure 2A:
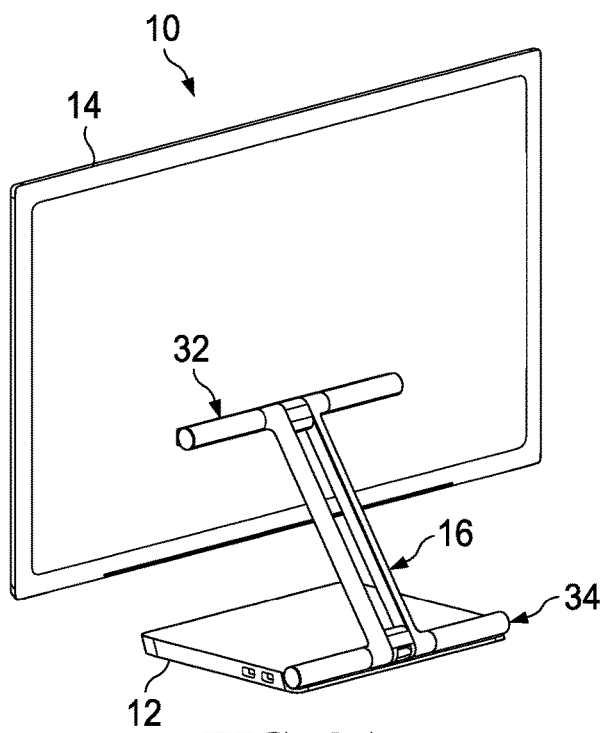
FIGS. 2A, 2B and 2C depict rear perspective views of a transition of the all-in-one information handling system display from a vertical viewing position to a horizontal drawing position with synchronized rotation of the support arm at a rear side of the information handling system housing and a central rear location of the display.
Figure 2B:
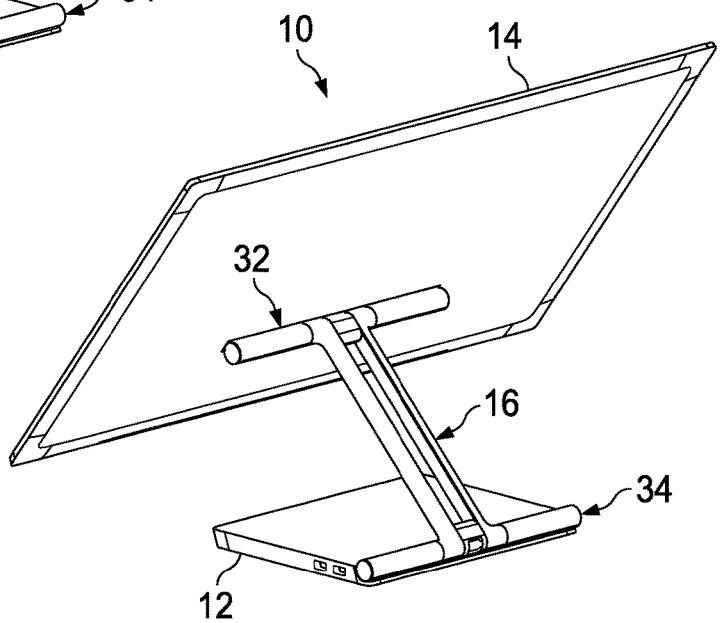
Figure 2C:
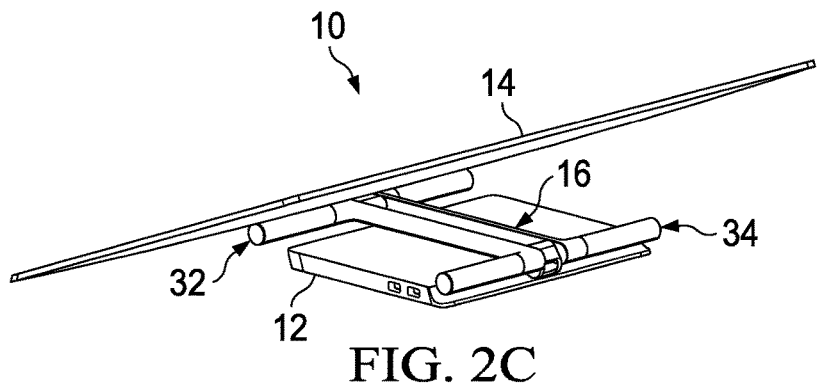

Referring now to FIGS. 2A, 2B and 2C, rear perspective views depict a transition of the all-in-one information handling system 10 and display 14 from a vertical viewing position to a horizontal drawing position with synchronized rotation of support arm 16 at a rear side of information handling system housing 12 and a central rear location of display 14. Synchronized rotation of support arm 16 relative to housing 12 is provided by a three cylinder sequence hinge assembly including a base hinge 34, a display hinge 32 and a secondary hinge integrated in display hinge 32 and described in greater depth below. FIG. 2A depicts a display hinge 32 coupled at a rear central location of display 14 holding display 14 in a vertical orientation for convenient viewing by an end user. Support arm 16 rotationally couples to display hinge 32 at one end and a base hinge 34 at an opposing end. Each of display hinge 32 and base hinge 34 rotate with an internal cylinder inserted in an external cylinder cover, and secondary hinge within display hinge 32 provides additional rotation independent of rotation of support arm 16. In the example embodiment, support arm 16 extends upward from the rear side of housing 12 at approximately a 45 degree angle. As described in greater depth below, display hinge 32 integrates a secondary hinge that allows rotation independent of support arm 16 to allow an end user to adjust the viewing angle of display 14 when in the vertical orientation. FIG. 2B depicts initiation of a transition from the vertical orientation to a horizontal orientation by a push at the top of display 14 towards the rear side of housing 12. As display 14 rotates from the vertical orientation towards the horizontal orientation, the rotational movement about display hinge 14 is translated to base hinge 34 to rotate support arm 16 from the raised position towards a horizontal position. FIG. 2C depicts completion of the transition of display 14 from the vertical viewing position to a horizontal drawing position having support arm 16 rotated to a horizontal position resting on the upper surface of housing 12. In the example embodiment, display 14 is slightly inclined to a substantially horizontal position that is comfortable for writing on the display surface, such as with a stylus. In an alternative embodiment, display 14 may have a completely horizontal position over top of housing 12. In addition, rotation of display 14 may be provided in the depicted horizontal position with a secondary hinge that rotates display 14 at display hinge 32 independent of synchronized motion with support arm 16. In one example embodiment, the bottom side of display 14 in the horizontal position rests against the support surface that supports housing 12 with the display bottom surface having a height of approximately that of the bottom of housing 12.

Figure 3:
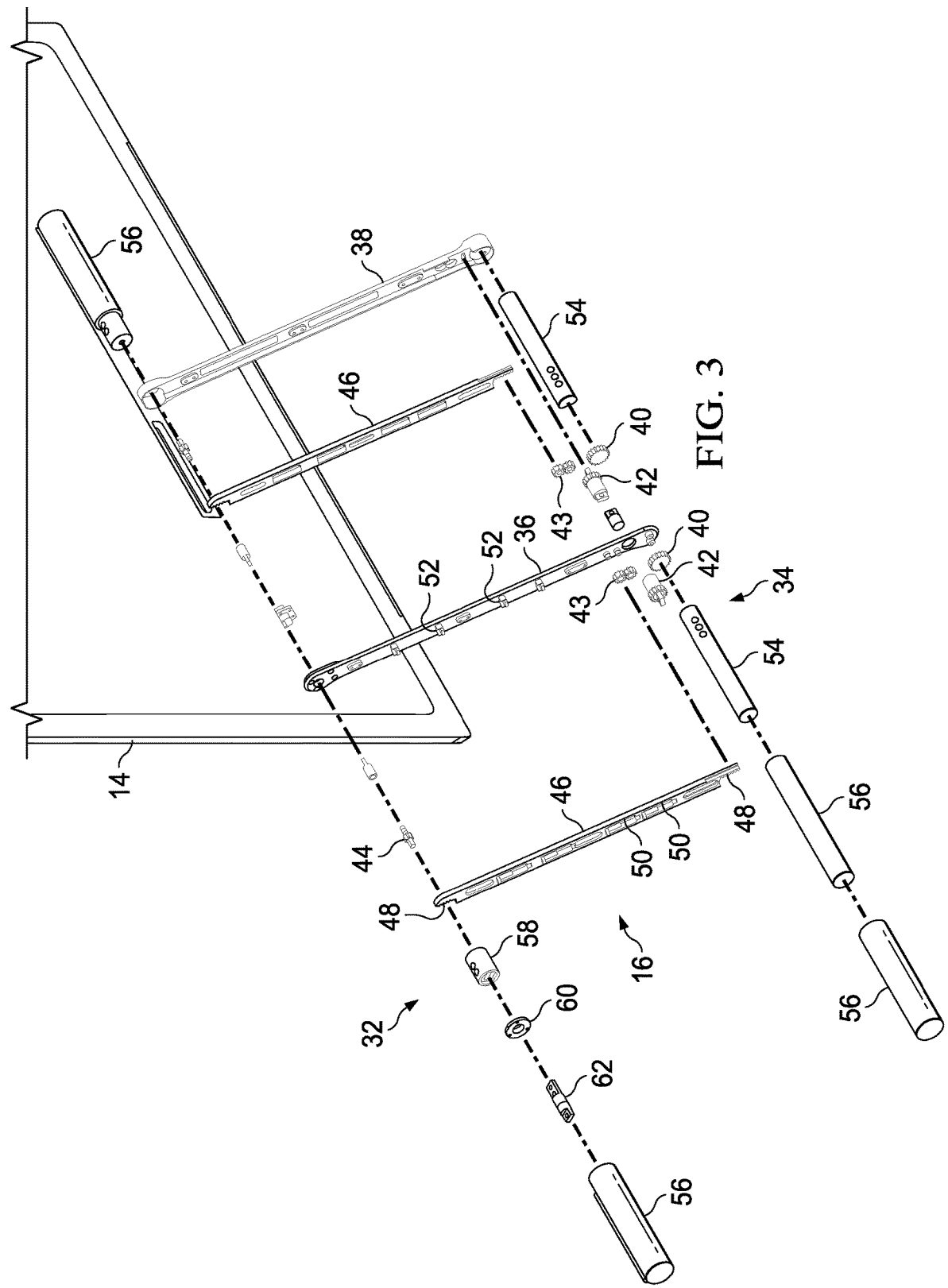
FIG. 3 depicts an exploded rear view of the display and support arm having a sliding synchronization mechanism that coordinates rotation of the display and support arm relative to the housing.

Referring now to FIG. 3, an exploded rear view of display 14 and support arm 16 depicts a sliding synchronization mechanism that coordinates rotation of display 14 and support arm 16 relative to housing 12. In the example embodiment, support arm 16 maintains a fixed distance for display 14 from housing 12 with an inner pivot arm 36 and an outer pivot arm 38 that rotationally couple at inner hinge covers 54 on opposing ends of each pivot arm. Inner hinge covers 54 rotate within outer hinge covers 56. A gear arm 46 couples in a sliding relationship with each pivot arm to slide relative to the pivot arm during rotation. At display 14, a display synchronizing gear 44 couples to each pivot arm to rotate with rotation of the pivot arm relative to display 14 and translate that rotation to gear arm 46 through engagement with gear teeth 48 integrated at each end of gear arm 46. At the opposing end of the pivot arms, a gear assembly coupled to each pivot arm interfaces with gear teeth 48 of gear arms 46 so that sliding motion of gear arm 46 translates to rotation of the pivot arms. In the example embodiment, the gear mechanism includes a torque gear 40 that rotates with each pivot arm and couples to a torque engine as described below, a conversion synchronization gear 42 that couples through both pivot arms to coordinate rotational angle, and conversion gears 43 that adapt the rotational movement direction. In the example embodiment, conversion synchronization gear 42 and conversion gears 43 provide a gear ratio reduction so that rotation of substantially 90 degrees of display 14 about display hinge 32 will provide rotation of substantially 45 degrees at base hinge 34.

In the example embodiment, the sliding relationship between the pivot and gear arms is leveraged to provide a bias of the support arm towards a raised position. Each gear arm 46 integrates bias springs 50 that engage with bias pins 52 of the pivot arms so that rotation to the horizontal position builds a counter rotation bias towards the vertical position of support arm 16. This bias upwards of support arm 16 reduces the weight of display 14 that an end user lifts to rotate to the vertical position. In addition, a secondary hinge 58 inserts with a washer 60 and pin 62 in each outer hinge cover 56 to support rotational adjustment of display 14 without translating the rotation to display synchronizing gear 44. Outer hinge covers 56 assemble over the gears to provide an aesthetic appearance and a support for rotation within of inner hinge covers 54.

Figure 4:
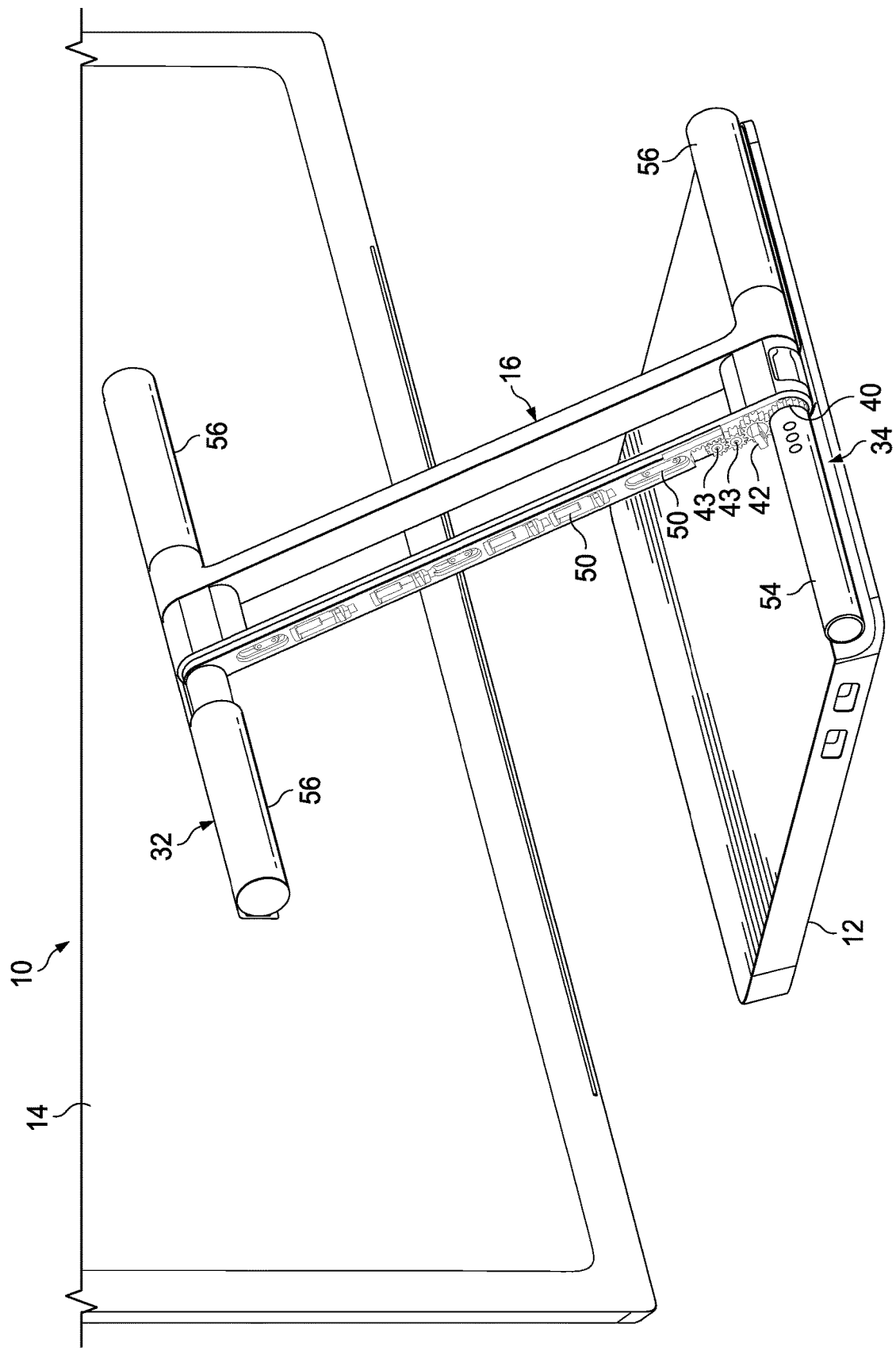
FIG. 4 depicts a side perspective cutaway view of an example of the support arm synchronization mechanism in a raised position.

Referring now to FIG. 4, a side perspective cutaway view depicts an example of support arm 16 synchronization mechanism in a raised position. As described above, support arm 16 has substantially a 45 degree angle from base hinge 34 at the rear of housing 12 to display hinge 32, although other angular relationships may be used in alternative embodiments. Torque gear 40 interfaces with a torque engine, as described below, that resists rotation of torque gear 40 induced by rotation of support arm 16. In the raised position, bias springs 50 have a relaxed tension based upon the relative position of gear arm 46 to the pivot arms as gear arm 46 slides to a forward position under the influence of a conversion gear 43.

Figure 5:
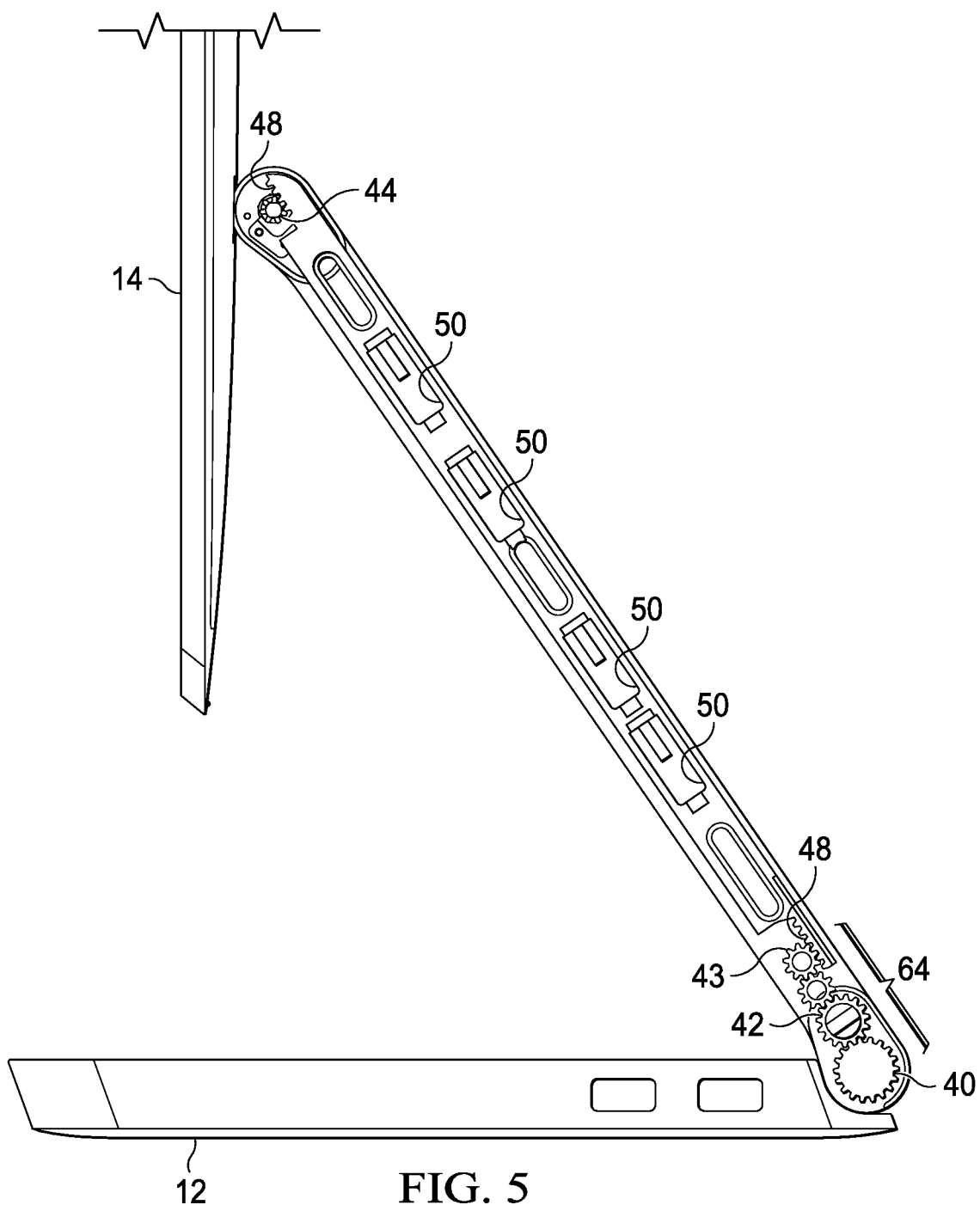
FIG. 5 depicts a side cutaway view of the gear relationships with support arm 16 in a raised position.
Figure 6:
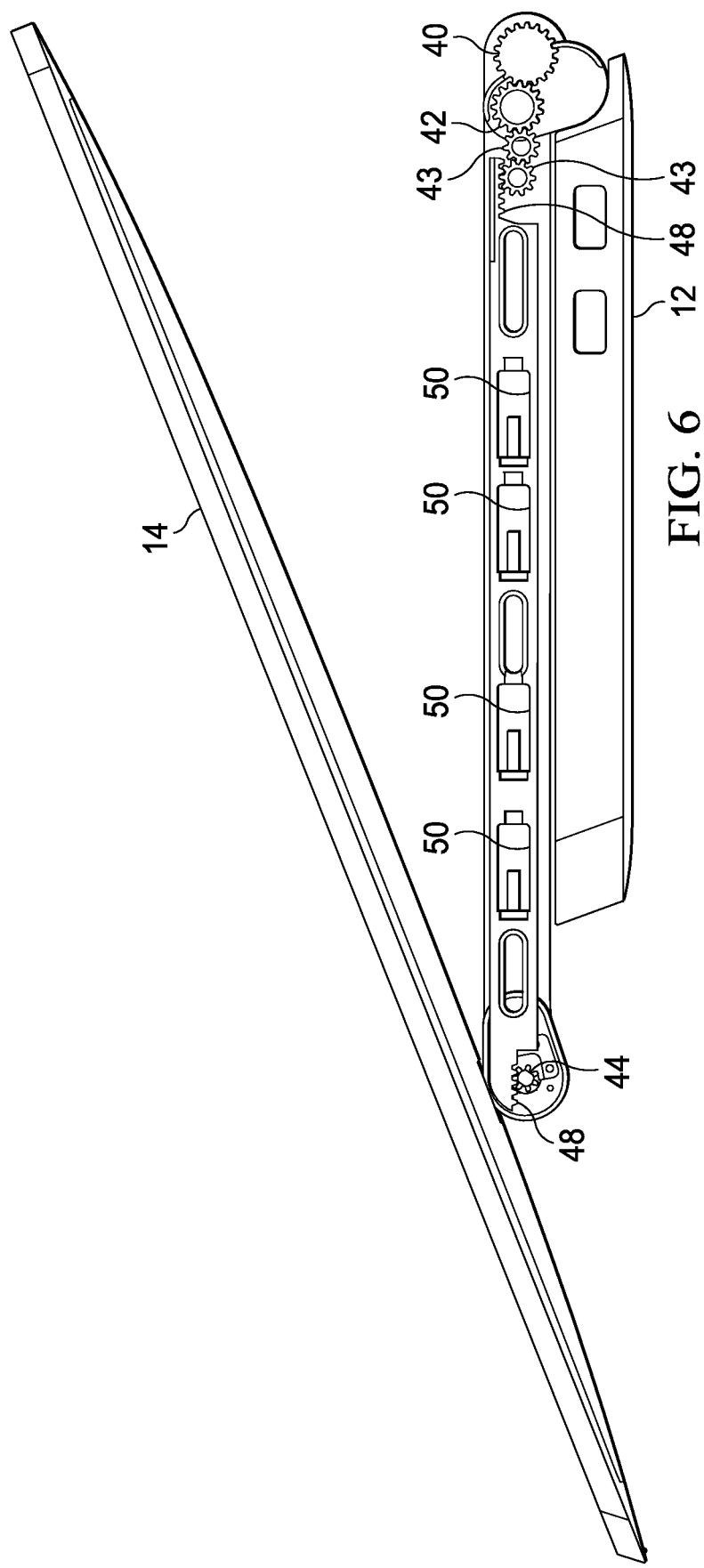
FIG. 6 depicts a side cutaway view of the gear relationship with support arm 16 in the lower position.

Referring now to FIG. 5, a side cutaway view depicts the gear relationships with support arm 16 in a raised position. Display synchronizing gear 44 engages gear teeth 48 to locate gear arm 46 to a rearward position relative to the pivot arms. Biasing springs 50 slide to a forward position relative to the pins extending from the pivot arms to release spring pressure. The base hinge has a conversion gear assembly 64 of torque gear 40, conversion synchronization gear 42 and conversion gears 43 that define a gear ratio for adjusting rotation about the base hinge to a lower rate than the display hinge. For instance, a 2:1 ratio may be used to rotate display 14 90 degrees to the horizontal orientation while rotating support arm 16 45 degrees to a horizontal orientation, such as depicted in FIG. 6. Conversion gear assembly 64 engages a conversion gear 43 with gear teeth 48 to slide gear arm 46 to the rearward position. As display 14 rotates, display synchronizing gear 44 engages gear teeth 48 to slide gear arm 46 and translate the rotation to conversion gear assembly 64. Sliding of gear arm 46 due to gear engagement compresses biasing springs 50 as support arm 16 drops in height so that the weight of display 14 is counteracted when rotation from the horizontal to the vertical orientation is initiated.

Referring now to FIG. 6, a side cutaway view depicts the gear relationship with support arm 16 in the lower position. In the example embodiment, display 14 and support arm 16 have rotated to a horizontal position. Display 14 at a neutral position of the secondary hinge has a slight incline that is comfortable for writing, however, the secondary hinge provides some degree of additional rotation so that an end user can further adapt the horizontal position as desired. In the example embodiment, the bottom edge of display 14 is coplanar with the bottom of housing 12 so that display 14 is provided with additional support to accept writing inputs. In the horizontal position, gear arm 46 is slid to a forward position by the engagement of gear teeth 48 with display synchronizing gear 44 and conversion gears 43. Movement of gear arm 46 to the forward position moves biasing springs 50 relative to the pins of support arm 16 to compress the springs and generate a lifting bias that reduces the weight of display 14 in response to an end user lifting motion.

Figure 7:
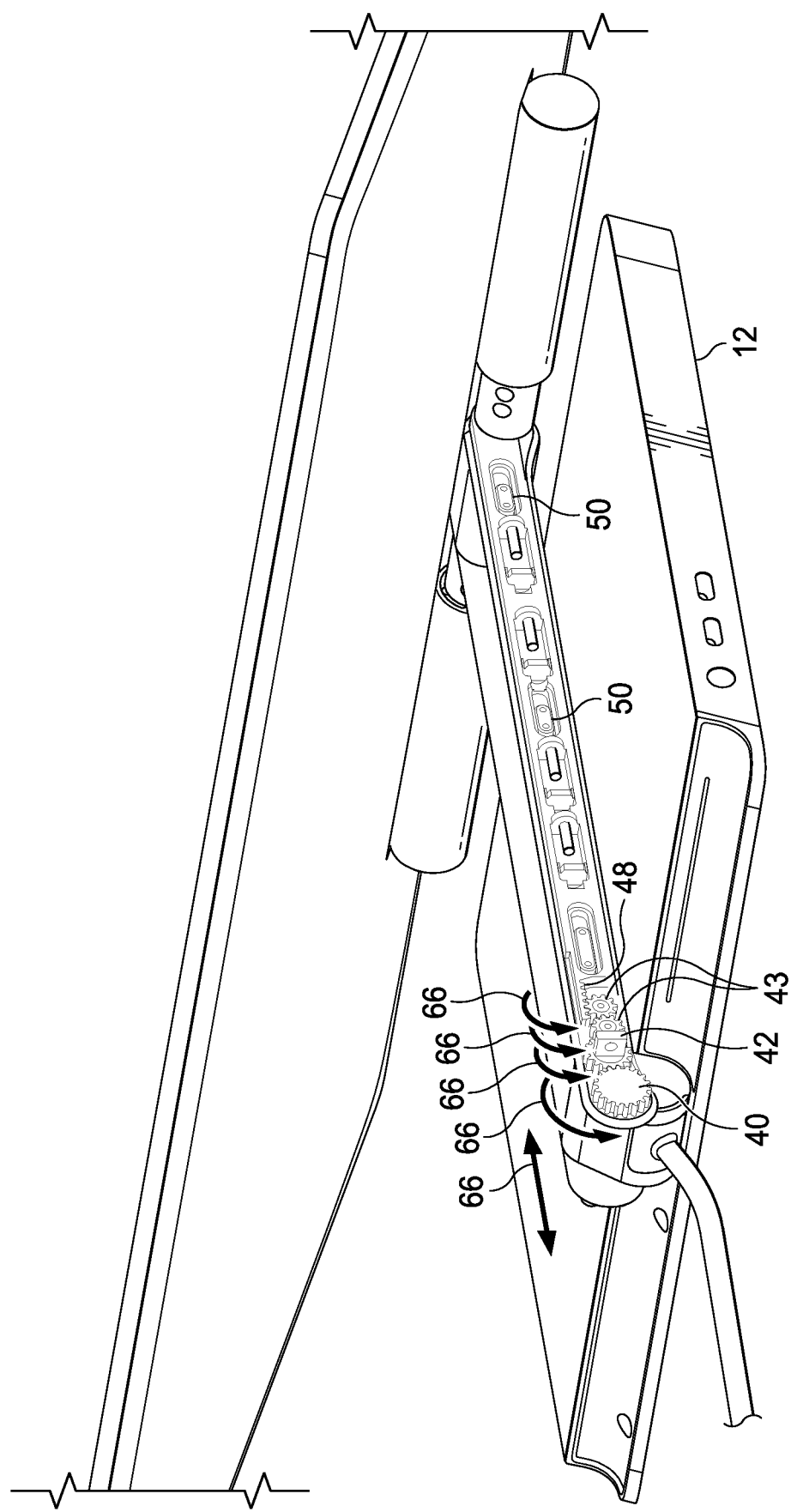
FIG. 7 depicts a side cutaway view of the opposing side of the support arm with gear translation provided at each side of the support arm.

Referring now to FIG. 7, a side cutaway view depicts the opposing side of support arm 16 with gear translation provided at each side of support arm 16. The example embodiment depicts that gear arms 46 slidingly engage on each of opposing sides of support arm 16. For instance, conversion synchronizer gear 42 is an assembly having gears interconnected by a central body so that gear arms 46 move in a synchronized manner. Directional arrows 66 illustrate the relative rotation of the gear assembly to translation rotational movement to gear teeth 48. In the horizontal position depicted, biasing springs 50 are compressed to provide an upward bias to support arm 16 so that an even biasing upward force is applied from each side of support arm 16.

Figure 8:
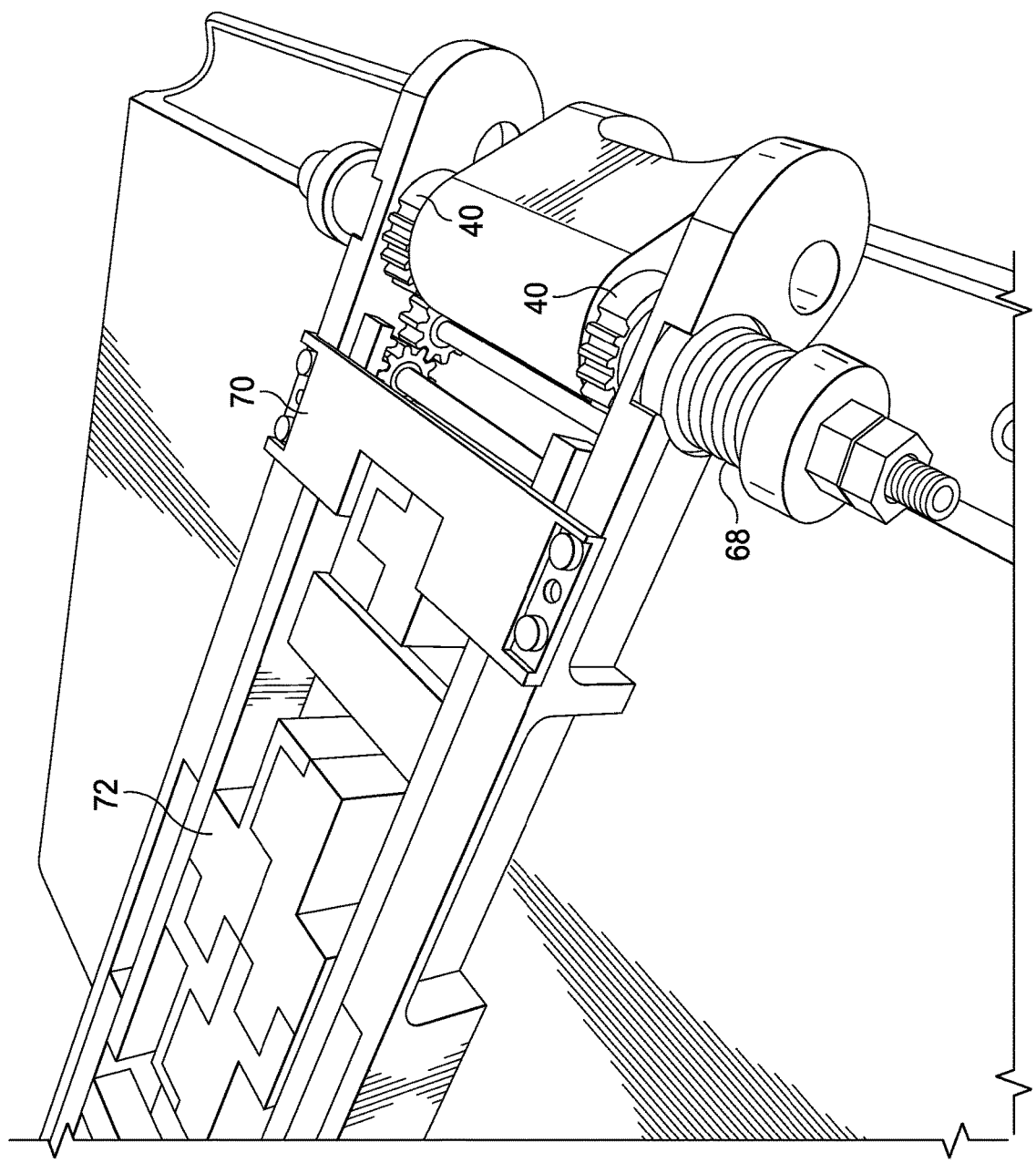
FIG. 8 depicts a rear perspective view of the support arm and torque engine with a cover of the support arm removed.

Referring now to FIG. 8, a rear perspective view depicts the support arm and torque engine 68 with a cover of the support arm removed. Torque engine 68 is, for example, a plurality of friction plates compressed to resist rotation of torque gear 40 as support arm 16 is rotated. Torque to resist rotation translates through the gear arms to manage rotation of the display. For example, the torque tends to maintain the position of support arm 16 at an orientation selected by an end user. Cross members 70 and 72 maintain spacing between the pivot arms and gear arms to offer a secure and robust construction that maintains display stability during movement and in a fixed position by opposing torsional forces.

Although the present invention has been described in detail, it should be understood that various changes, substitutions and alterations can be made hereto without departing from the spirit and scope of the invention as defined by the appended claims.

What is claimed is:

1. An information handling system comprising; a main housing configured to rest a bottom surface on a support surface; processing components disposed in the main housing and operable to process information; a display interfaced with the processing components and operable to present the information as visual images; and a support arm rotationally coupled at a first end to the main housing and at an opposing second end to the display, the support arm having pivot arm rotationally coupled at a first end to a rear side of the main housing and at a second end to a central location of the display, the support arm slidingly coupled to a gear arm, the gear arm engaged at a first end with a base synchronizing gear at the support arm first end and a display synchronizing gear at the support arm second end, the base synchronizing gear and the display synchronizing gear cooperating through the gear arm to translate movement of the display from a vertical orientation at a forward position and first height relative to the main housing to a horizontal orientation at a central position and second height relative to the main housing.

2. The information handling system of claim 1 further comprising:
   a torque generator coupled to the support arm at the first end and operable to generate torque to resist rotation of the support arm at the first end; and
   a torque gear coupled to the torque generator and the base synchronizing gear, the torque gear translating rotation of the support arm at the first end to the base synchronizing gear.

3. The information handling system of claim 2 further comprising a conversion synchronizer gear disposed between torque gear and the base synchronizing gear to increase the rotational movement of the support arm at the display relative to rotational movement of the support arm at the housing.

4. The information handling system of claim 3 further comprising:
   plural biasing springs integrated in the gear arm; and
   plural biasing pins extending from the support arm towards the gear arm, each biasing pin engaging one of the biasing springs;
   wherein the biasing springs bias the support arm to raise the display to the vertical orientation.

5. The information handling system of claim 3 wherein the gear arm terminates at first and second ends with first and second gear teeth, the first gear teeth engaged with the base synchronizing gear, the second gear teeth engaged with the display synchronizing gear.

6. The information handling system of claim 1 wherein the support arm further has an outer pivot arm and an inner pivot arm disposed in a spaced parallel configuration by a cross member.

7. The information handling system of claim 1 wherein the support arm rests against an upper surface of the main housing when the display rotates to the horizontal orientation.

8. The information handling system of claim 1 further comprising a secondary hinge disposed between the display and support arm and operable to rotate the display relative to the support arm.

9. The information handling system of claim 1 wherein the display comprises a touchscreen operable to accept touch inputs for communication to the processing components.

10. A method for coupling a display to an information handling system, the method comprising: rotationally coupling a support arm at a first end to a rear side of a housing of the information handling system; rotationally coupling the support arm at a second end to a central location at a rear side of the display; holding the display with the support arm in a vertical orientation at a front side of the housing; pushing against an upper side of the display to rotate the display from the vertical orientation towards a horizontal orientation; and translating rotation of the display from the support arm second end to the first end to rotate the support arm from an elevated position above the housing to a horizontal position resting on the housing, wherein the translating rotation further comprises: coupling a gear arm to the support arm in a sliding relationship; coupling a first gear to the first end of the support arm; coupling a second gear to the second end of the support arm; engaging the first gear with first teeth of the gear arm; engaging the second gear with second teeth of the gear arm; and translating rotation with a sliding motion of the gear arm.

11. The method of claim 10 further comprising:
   pulling up at the upper side of the display to rotate the display from the horizontal orientation towards the vertical orientation; and
   translating rotation of the display from the support arm second end to the first end to rotate the support arm from the horizontal position to the elevated position above the housing.

12. The method of claim 10 further comprising: interfacing plural engaged gears between the support arm first end and first teeth; and reducing the rotation about the first end relative to the rotation about the second end with a gear ratio of the plural engaged gears.

13. The method of claim 10 further comprising: generating torque at the first gear that resists rotation of the first gear; and applying the torque to maintain the display at a selected position by resisting rotation at the second end translated through the support arm.

14. The method of claim 10 further comprising: rotationally coupling the display at the second end with a secondary hinge; and rotating the display about the secondary hinge independent of the second gear.

15. The method of claim 14 further comprising:
   coupling one or more biasing devices between the support arm and the gear arm; and applying bias of the biasing device towards sliding the gear arm relative to the support arm towards the elevated position.

16. A support arm comprising:

first and second pivot arms held in a fixed parallel relationship;

a first gear arm coupled in a sliding relationship with the first pivot arm, the first gear arm having teeth at opposing ends;

a second gear arm coupled in a sliding relationship with the second pivot arm, the second gear arm having teeth at opposing ends;

a first gear arrangement coupled to a first end of the first and second pivot arms and engaged with the first and second gear arm teeth; the first gear arrangement configured to couple to an information handling system housing; and a second gear arrangement coupled to a second end of the first and second pivot arms and engaged with the first and second gear arm teeth, the second gear arrangement configured to couple to a display;

wherein rotation of the second gear arrangement translates by a sliding motion of the first and second gear arms relative to the first and second pivot arms to rotation of the first gear arrangement.

17. The support arm of claim 16 further comprising a secondary hinge disposed proximate the second gear mechanism to provide rotation relative to the first and second pivot arms with second gear arrangement movement relative to the teeth.

18. The support arm of claim 16 further comprising a torque generator coupled to the first gear arrangement to generate torque that resists rotation of the first gear arrangement.

19. The support arm of claim 16 wherein the first gear arrangement has a first gear ratio between plural gears to provide a predetermined relative rotational movement translated through the first and second gear arms.

\* \* \* \* \*